United States Patent
Ryan et al.

(10) Patent No.: US 12,486,097 B2
(45) Date of Patent: Dec. 2, 2025

(54) BEVERAGE INSULATION DEVICE

(71) Applicants: Stephen Ryan, Backmede (AU); Bec Ryan, Backmede (AU); Luke Garred, Backmede (AU); Amanda Garred, Backmede (AU)

(72) Inventors: Stephen Ryan, Backmede (AU); Bec Ryan, Backmede (AU); Luke Garred, Backmede (AU); Amanda Garred, Backmede (AU)

(*) Notice: Subject to any disclaimer, the term of this patent is extended or adjusted under 35 U.S.C. 154(b) by 42 days.

(21) Appl. No.: 18/403,938

(22) Filed: Jan. 4, 2024

(65) Prior Publication Data

US 2025/0223098 A1    Jul. 10, 2025

(51) Int. Cl.
*B65D 81/38* (2006.01)
*B65D 21/02* (2006.01)

(52) U.S. Cl.
CPC ..... *B65D 81/3876* (2013.01); *B65D 21/0224* (2013.01)

(58) Field of Classification Search
CPC ............ B65D 81/3876; B65D 81/3881; B65D 81/3879; B65D 81/3883; B65D 81/3886; B65D 21/0224
See application file for complete search history.

(56) References Cited

U.S. PATENT DOCUMENTS

| | | | |
|---|---|---|---|
| 4,293,015 A | 10/1981 | McGough | |
| 8,025,146 B2 | 9/2011 | Willis | |
| 8,424,713 B2 | 4/2013 | Bolland | |
| 8,584,882 B2* | 11/2013 | Hammerle | A47J 43/27 220/4.27 |
| 10,913,593 B2 | 2/2021 | Adjeleian | |
| 11,591,138 B1* | 2/2023 | Peters | B65D 71/502 |
| 11,819,149 B1* | 11/2023 | Etchison | B65D 25/28 |
| 2014/0209621 A1* | 7/2014 | Irish | B65D 81/3879 220/739 |
| 2017/0273483 A1* | 9/2017 | McArthur | B65D 51/28 |
| 2023/0174292 A1* | 6/2023 | Tollefspol | B65D 51/14 220/739 |

FOREIGN PATENT DOCUMENTS

WO    WO9102475    3/1991

\* cited by examiner

*Primary Examiner* — Javier A Pagan

(57) ABSTRACT

A beverage insulation device for insulating and carrying a stack of beverage cans includes a sleeve having a base wall and a peripheral wall that is coupled to and extends upwardly from the base wall to define an interior space. The sleeve is cylindrical to receive a first can. The sleeve includes an insulated material for insulating contents of the first can from outside temperatures. A lip coupled to and extending downwardly from the base wall defines a cavity. The cavity is cylindrical to receive a second can. A plurality of tabs is coupled to and extends outwardly from the lip into the cavity. The plurality of tabs engage an outer perimeter of the annular lip of the second can to releasably retain the top surface of the second can within the cavity wherein the first can is stackable over the second can.

8 Claims, 6 Drawing Sheets

BEVERAGE INSULATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to insulated beverage holders and more particularly pertains to a new insulated beverage holder for insulating and carrying a stack of beverage cans.

(2) Description of Related Art Including Information Disclosed Under 37 CFR 1.97 and 1.98

The prior art relates to insulated beverage holders. For example, the prior art relates to koozies, or cozies, that generally comprise fabric or foam sleeves for insulating beverage containers to keep them cool. People often use these koozies when attending outdoor events such as concerts, cookouts, or fairs. Such events can often be busy, with long lines leading up to drink vendors. Consequently, people will often purchase two or more beverages at one time, to avoid waiting in line again while enjoying the event. Often, the vendors will open all of the beverage cans the person has purchased, making it difficult for the person to carry the opened cans with them. Additionally, because the person is carrying the beverage cans in their hands, and the weather at such outdoor events can often be warm, the contents of the beverage cans can quickly get warm. Thus, there is a need in the art for an insulated beverage holder that can insulate contents of the beverage cans from outside temperatures and that can facilitate the user in carrying multiple beverage cans in a single hand without spilling contents of the cans when the cans are opened.

BRIEF SUMMARY OF THE INVENTION

An embodiment of the disclosure meets the needs presented above by generally comprising a sleeve having a base wall and a peripheral wall that is coupled to and extends upwardly from the base wall to define an interior space. The sleeve is cylindrical wherein the interior space is configured to receive a first can. The sleeve comprises an insulated material that is configured to insulate contents of the first can from outside temperatures when the first can is positioned within the interior space. A lip is coupled to and extends downwardly from the base wall to define a cavity beneath the base wall. The cavity is cylindrical wherein the cavity is configured to receive a second can. A plurality of tabs is coupled to and extends outwardly from the lip into the cavity. The plurality of tabs is configured to engage an outer perimeter of the annular lip of the second can to releasably retain the top surface of the second can within the cavity wherein the first can is stackable over the second can when the first can is positioned within the sleeve and the second can is positioned within the cavity.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
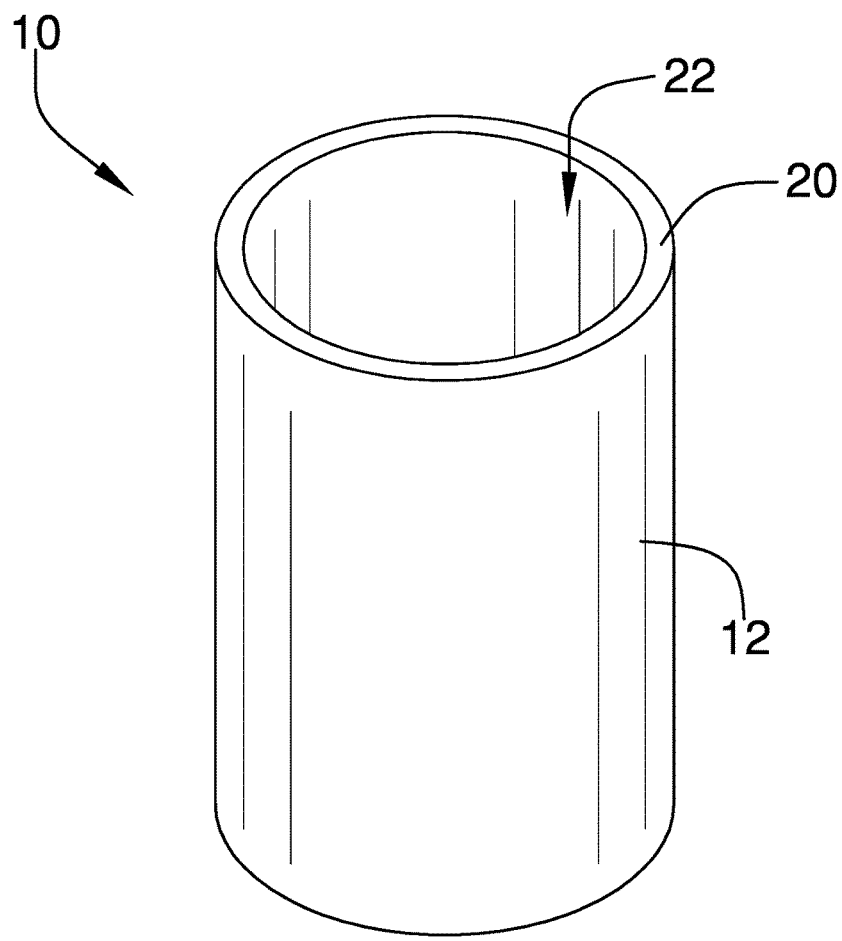
FIG. 1 is a top isometric view of a beverage insulation device according to an embodiment of the disclosure.
Figure 2:
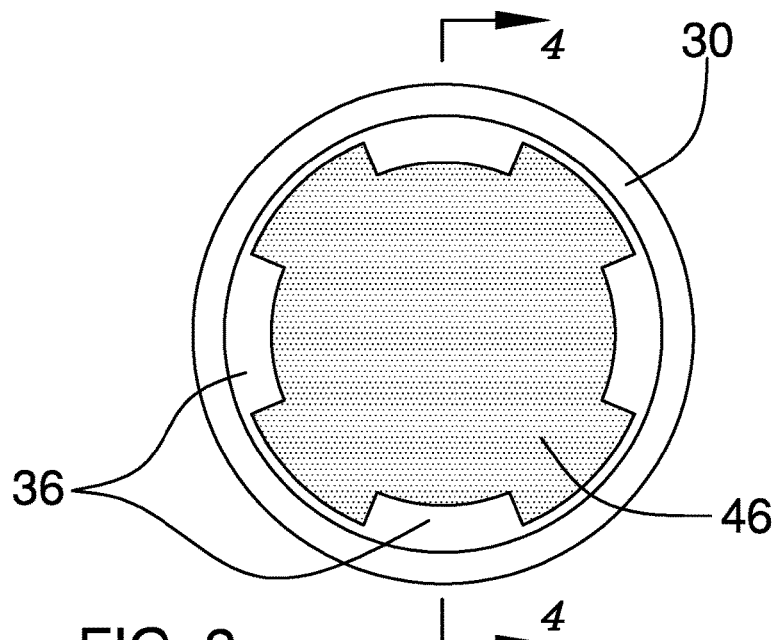
FIG. 2 is a bottom view of an embodiment of the disclosure.
Figure 3:
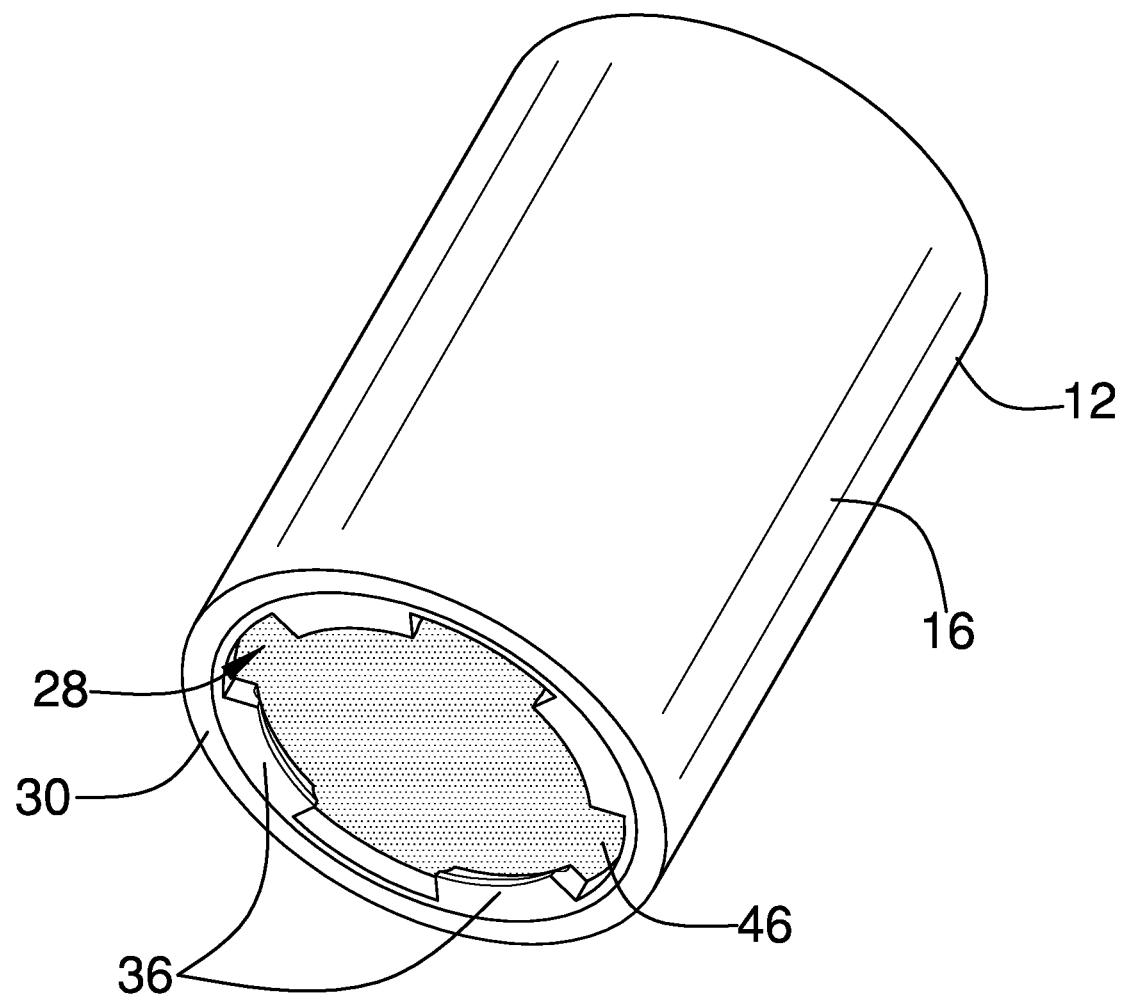
FIG. 3 is an isometric view of an embodiment of the disclosure.
Figure 4:
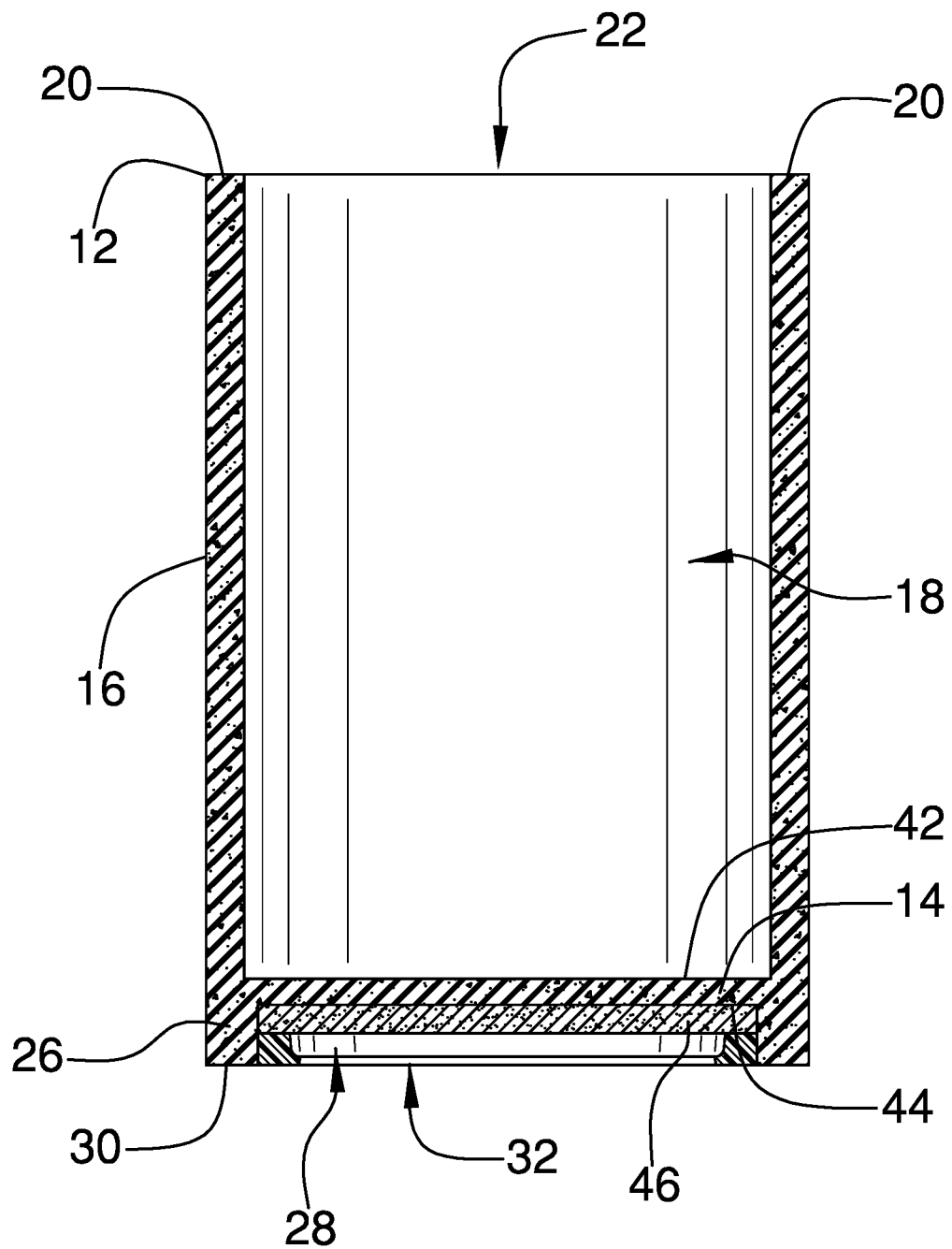
FIG. 4 is a cross-sectional view of an embodiment of the disclosure.
Figure 5:
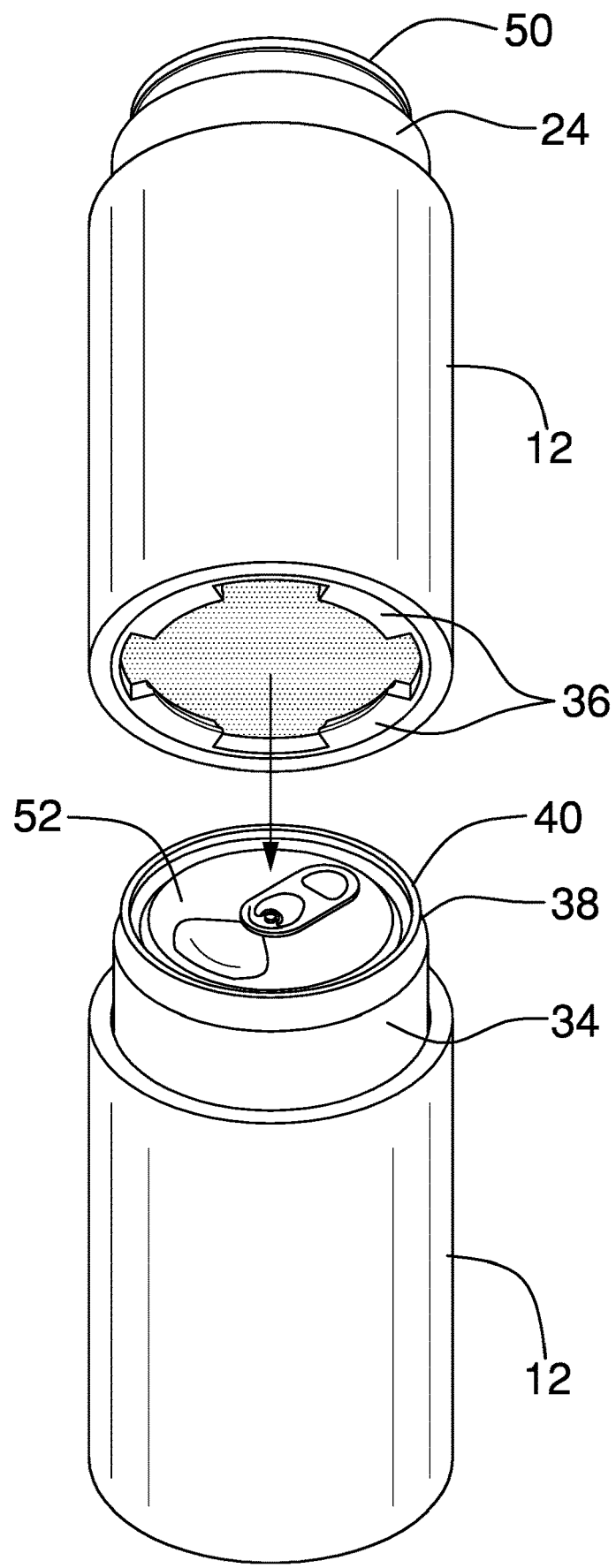
FIG. 5 is an in-use view of an embodiment of the disclosure.
Figure 6:
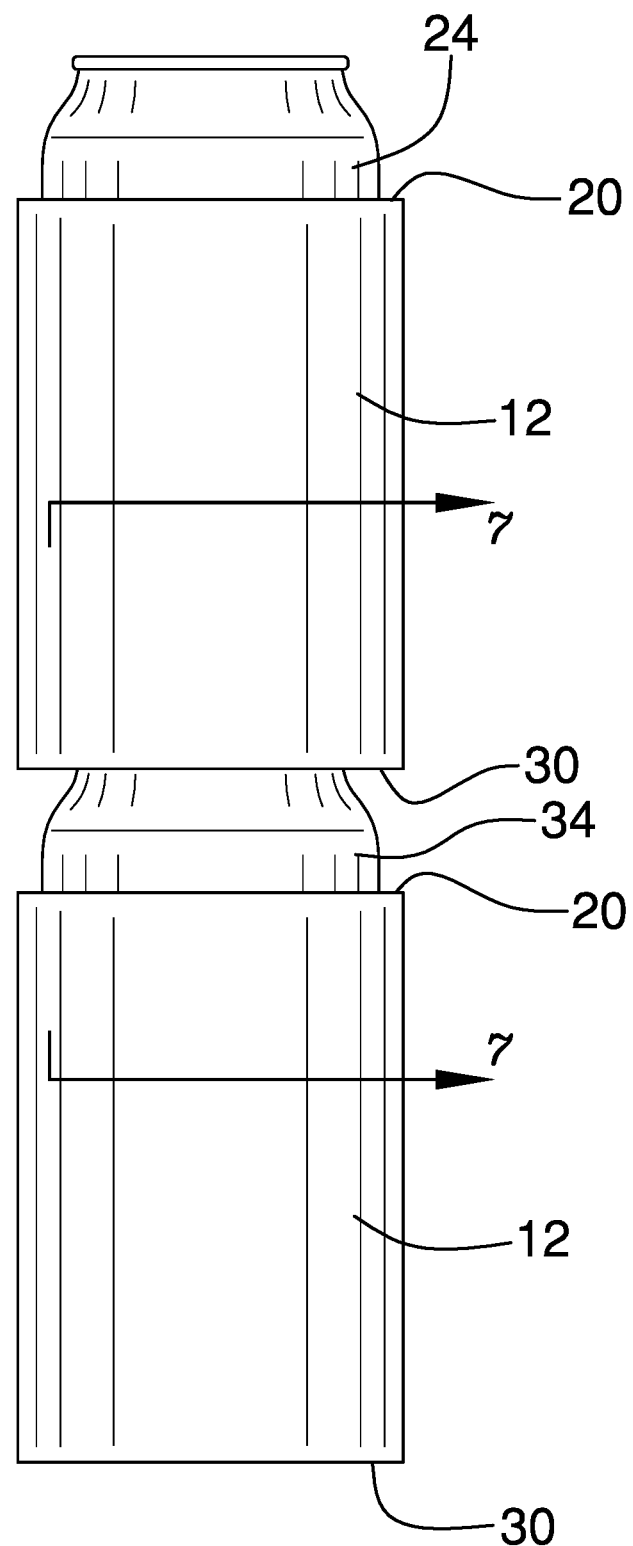
FIG. 6 is an in-use view of an embodiment of the disclosure.
Figure 7:
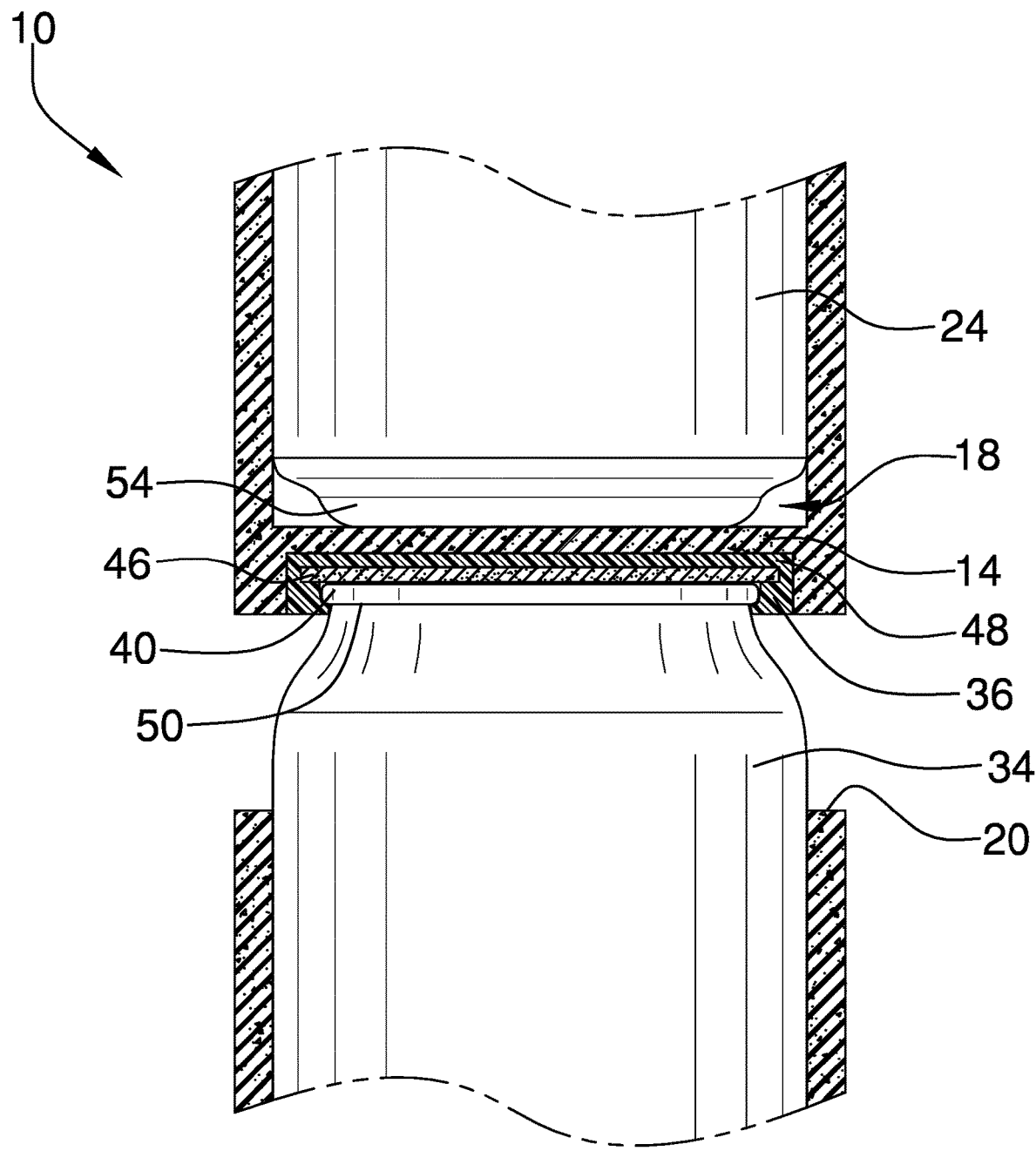
FIG. 7 is a cross-sectional view of an embodiment of the disclosure.

With reference now to the drawings, and in particular to FIGS. 1 through 7 thereof, a new insulated beverage holder embodying the principles and concepts of an embodiment of the disclosure and generally designated by the reference numeral 10 will be described.

As best illustrated in FIGS. 1 through 7, the beverage insulation device 10 generally comprises a sleeve 12 having a base wall 14 and a peripheral wall 16 is coupled to and extends upwardly from the base wall 14 to define an interior space 18. The peripheral wall 16 has an upper edge 20 that is distal to the base wall 14. The upper edge 20 defines an opening 22 into the interior space 18. The base wall 14 is generally round wherein the sleeve 12 is cylindrical such that the interior space 18 is configured to receive a first can 24. The sleeve 12 comprises an insulated material that is configured to insulate contents of the first can 24 from outside temperatures when the first can 24 is positioned within the interior space 18. The sleeve 12 may have a height that is configured to be smaller than a height of the first can 24 wherein the upper edge 20 is configured to be positioned beneath an upper surface 50 of the first can 24 when the first can 24 is fully inserted into the sleeve 12.

A lip 26 is coupled to and extends downwardly from the base wall 14 to define a cavity 28 beneath the base wall 14. The lip 26 has a lower edge 30 that is distal to the base wall 14. The lower edge 30 defines an entrance 32 into the cavity 28. The cavity 28 generally has a cylindrical shape that is configured to receive a top surface 52 of a second can 34.

A plurality of tabs 36 is coupled to and extends outwardly from the lip 26 into the cavity 28. Each tab of the plurality of tabs 36 may be spaced from an adjacent tab of the plurality of tabs 36. The plurality of tabs 36 is configured to engage an outer perimeter 38 of an annular lip 40 of the top surface 52 the second can 34 to releasably retain the top surface 52 of the second can 34 within the cavity 28. The first can 24 is stackable over the second can 34 when the first can 24 is positioned within the sleeve 12 and the second can 34 is positioned within the cavity 28. The base wall 14 is configured to be positioned between the first can 24 and the second can 34.

For example, the base wall 14 of the sleeve 12 may have a primary face 42 that is positioned within the interior space 18 and a secondary face 44 that is positioned within the cavity 28. The primary face 42 is generally configured to be positioned adjacent to a lower surface 54 of the first can 24 when the first can 24 is fully inserted into the sleeve 12. The secondary face 44 is generally configured to be positioned proximate to the top surface 52 of the second can 34 when the second can 34 is fully inserted into the cavity 28.

A seal 46 may be coupled to and extend across the secondary face 44 of the base wall 14. The seal 46 may cover all, or substantially all, of the secondary face 44 of the base wall 14. The seal 46 generally comprises a rubber material that is configured to engage the annular lip 40 of the top surface 52 of the second can 34. The seal 46 is configured to inhibit contents of the second can 34 from spilling when the top surface 52 of the second can 34 is opened.

A tab plate 48 may be coupled to the base wall 14 and to each tab of the plurality of tabs 36. The tab plate 48 may be positioned between the base wall 14 and the seal 46. Each tab of the plurality of tabs 36 may extend downwardly from the tab plate 48 wherein the plurality of tabs 36 is configured to releasably engage the top surface 52 of the second can 34.

In use, the first can 24 can be inserted into the interior space 18 of the sleeve 12 to insulate the contents of the first can 24 from outside temperatures. The second can 34 can be inserted into the cavity 28 such that plurality of tabs 36 releasably couples the second can 34 to the sleeve 12. Thus, the first can 24 and the second can 34 are both engaged by the beverage insulation device 10 and stacked together to facilitate a user in carrying both cans in a single hand. The second can 34 may be inserted into a second sleeve 12 to insulate contents of the second can 34 from outside temperatures.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A beverage can insulation assembly comprising:
   a sleeve having a base wall and a peripheral wall being coupled to and extending upwardly from the base wall to define an interior space, the sleeve being cylindrical wherein the interior space is configured to receive a first can, the sleeve comprising an insulated material being configured to insulate contents of the first can from outside temperatures when the first can is positioned within the interior space;
   a lip being coupled to and extending downwardly from the base wall to define a cavity beneath the base wall, the cavity being cylindrical wherein the cavity is configured to receive a second can;
   a plurality of tabs being coupled to and extending outwardly from the lip into the cavity, the plurality of tabs being configured to engage an outer perimeter of an annular lip of a top surface of the second can to releasably retain a top surface of the second can within the cavity wherein the first can is stackable over the second can when the first can is positioned within the sleeve and the second can is positioned within the cavity;
   a seal being coupled to and extending across a secondary face of the base wall, the secondary face being positioned within the cavity; and
   a tab plate being coupled to the base wall and each tab of the plurality of tabs, the tab plate being positioned between the base wall and the seal, each tab of the plurality of tabs extending downwardly from the tab plate wherein the plurality of tabs is configured to releasably engage the top surface of the second can.

2. The beverage can insulation assembly of claim 1, wherein the peripheral wall has an upper edge being distal to the base wall, the upper edge defining an opening into the interior space.

3. The beverage can insulation assembly of claim 2, wherein the sleeve has a height being configured to be smaller than a height of the first can wherein the upper edge is configured to be positioned beneath an upper surface of the first can when the first can is fully inserted into the sleeve.

4. The beverage can insulation assembly of claim 1, wherein the lip has a lower edge being distal to the base wall, the lower edge defining an entrance into the cavity.

5. The beverage can insulation assembly of claim 1, wherein each tab of the plurality of tabs is spaced from an adjacent tab of the plurality of tabs.

6. The beverage can insulation assembly of claim 1, wherein the base wall of the sleeve has a primary face being positioned within the interior space and a secondary face being positioned within the cavity, the primary face being configured to be positioned adjacent to a lower surface of the first can when the first can is fully inserted into the sleeve, the secondary face being configured to be positioned proximate to the top surface of the second can when the second can is fully inserted into the cavity.

7. The beverage can insulation assembly of claim 1, wherein the seal comprises a rubber material being configured to engage an annular lip of the top surface of the second can wherein the seal is configured to inhibit contents of the second can from spilling when the top surface of the second can is opened.

8. A beverage can insulation assembly comprising:
 a sleeve having a base wall and a peripheral wall being coupled to and extending upwardly from the base wall to define an interior space, the peripheral wall having an upper edge being distal to the base wall, the upper edge defining an opening into the interior space, the base wall being round wherein the sleeve is cylindrical such that the interior space is configured to receive a first can, the sleeve comprising an insulated material being configured to insulate contents of the first can from outside temperatures when the first can is positioned within the interior space, the sleeve having a height being configured to be smaller than a height of the first can wherein the upper edge is configured to be positioned beneath an upper surface of the first can when the first can is fully inserted into the sleeve;
 a lip being coupled to and extending downwardly from the base wall to define a cavity beneath the base wall, the lip having a lower edge being distal to the base wall, the lower edge defining an entrance into the cavity, the cavity being cylindrical wherein the cavity is configured to receive a second can;
 a plurality of tabs being coupled to and extending outwardly from the lip into the cavity, each tab of the plurality of tabs being spaced from an adjacent tab of the plurality of tabs, the plurality of tabs being configured to engage an outer perimeter of an annular lip of a top surface of the second can to releasably retain the top surface of the second can within the cavity wherein the first can is stackable over the second can when the first can is positioned within the sleeve and the second can is positioned within the cavity, the base wall being configured to be positioned between the first can and the second can;
 wherein the base wall of the sleeve has a primary face being positioned within the interior space and a secondary face being positioned within the cavity, the primary face being configured to be positioned adjacent to a lower surface of the first can when the first can is fully inserted into the sleeve, the secondary face being configured to be positioned proximate to a top surface of the second can when the second can is fully inserted into the cavity;
 a seal being coupled to and extending across the secondary face of the base wall, the seal comprising a rubber material being configured to engage the annular lip of the top surface of the second can wherein the seal is configured to inhibit contents of the second can from spilling when the top surface of the second can is opened; and
 a tab plate being coupled to the base wall and each tab of the plurality of tabs, the tab plate being positioned between the base wall and the seal, each tab of the plurality of tabs extending downwardly from the tab plate wherein the plurality of tabs is configured to releasably engage the top surface of the second can.

* * * * *